United States Patent [19]

McTague et al.

[11] Patent Number: 5,850,557
[45] Date of Patent: Dec. 15, 1998

[54] METHOD AND APPARATUS FOR REDUCING BUS BRIDGE THRASHING BY TEMPORARILY MASKING AGENT REQUESTS TO ALLOW CONFLICTING REQUESTS TO BE COMPLETED

[75] Inventors: Michael J. McTague, Portland; Bradford B. Congdon, Aloha, both of Oreg.

[73] Assignee: Intel Corporation, Santa Clara, Calif.

[21] Appl. No.: 644,833

[22] Filed: May 10, 1996

[51] Int. Cl.[6] .................................................. G06F 13/38
[52] U.S. Cl. .......................... 395/735; 395/750; 395/556; 364/200; 364/493; 364/483
[58] Field of Search ..................... 395/750, 740, 395/556, 728, 292, 306, 800, 869, 309, 735; 364/200, 493, 483; 370/440

[56] References Cited

U.S. PATENT DOCUMENTS

| | | | |
|---|---|---|---|
| 4,615,005 | 9/1986 | Maejima et al. | 364/200 |
| 5,124,981 | 6/1992 | Golding | 370/85.1 |
| 5,269,005 | 12/1993 | Heil et al. | 395/275 |
| 5,327,570 | 7/1994 | Foster et al. | |
| 5,333,276 | 7/1994 | Solari . | |
| 5,369,748 | 11/1994 | McFarland et al. | |
| 5,426,740 | 6/1995 | Bennett | 395/325 |
| 5,535,340 | 7/1996 | Bell et al. | |
| 5,546,546 | 8/1996 | Bell et al. | |
| 5,588,125 | 12/1996 | Bennett | 395/306 |
| 5,596,729 | 1/1997 | Lester et al. | 395/308 |
| 5,634,112 | 5/1997 | Thome et al. | 395/481 |

OTHER PUBLICATIONS

Dix, F.R., M. Kelly, and R.W. Klessig, "Access to a Public Switched Multi–Megabit Data Service Offering", Bell Communications Research, Inc., Red Bank, NJ, pp. 46–61.

Popescu, Val, Merle Schultz, John Spracklen, Gary Gibson, Bruce Lightner and David Isaman, "The Metaflow Architecture", IEEE Micro, Jun. 1991, pp. 10–13 and 63–73.

*Peripheral Components: Chip Sets, PC I/O Peripherals, Memory Controllers, UPI: Keyboard Controllers, Support Peripherals*, Intel Corporation, 1994, pp. 1–419–1–429, 1–472, 1–508 & 1–512.

*Primary Examiner*—Ayaz R. Sheikh
*Assistant Examiner*—Eric S. Thlang
*Attorney, Agent, or Firm*—Blakely, Sokoloff, Taylor & Zafman

[57] ABSTRACT

A method and apparatus for masking processor requests to improve bus efficiency includes a bus bridge having a detection logic for determining when a first processor on a first bus has been backed off the first bus a predetermined number of times. When the detection logic determines the first processor has been backed off the first bus the predetermined number of times, a timer is set to a first value, with the first value being sufficient to allow an agent on a second bus to access the first bus. A masking logic, coupled to the detection logic and the timer, is for masking requests from the first processor until the timer expires.

4 Claims, 5 Drawing Sheets

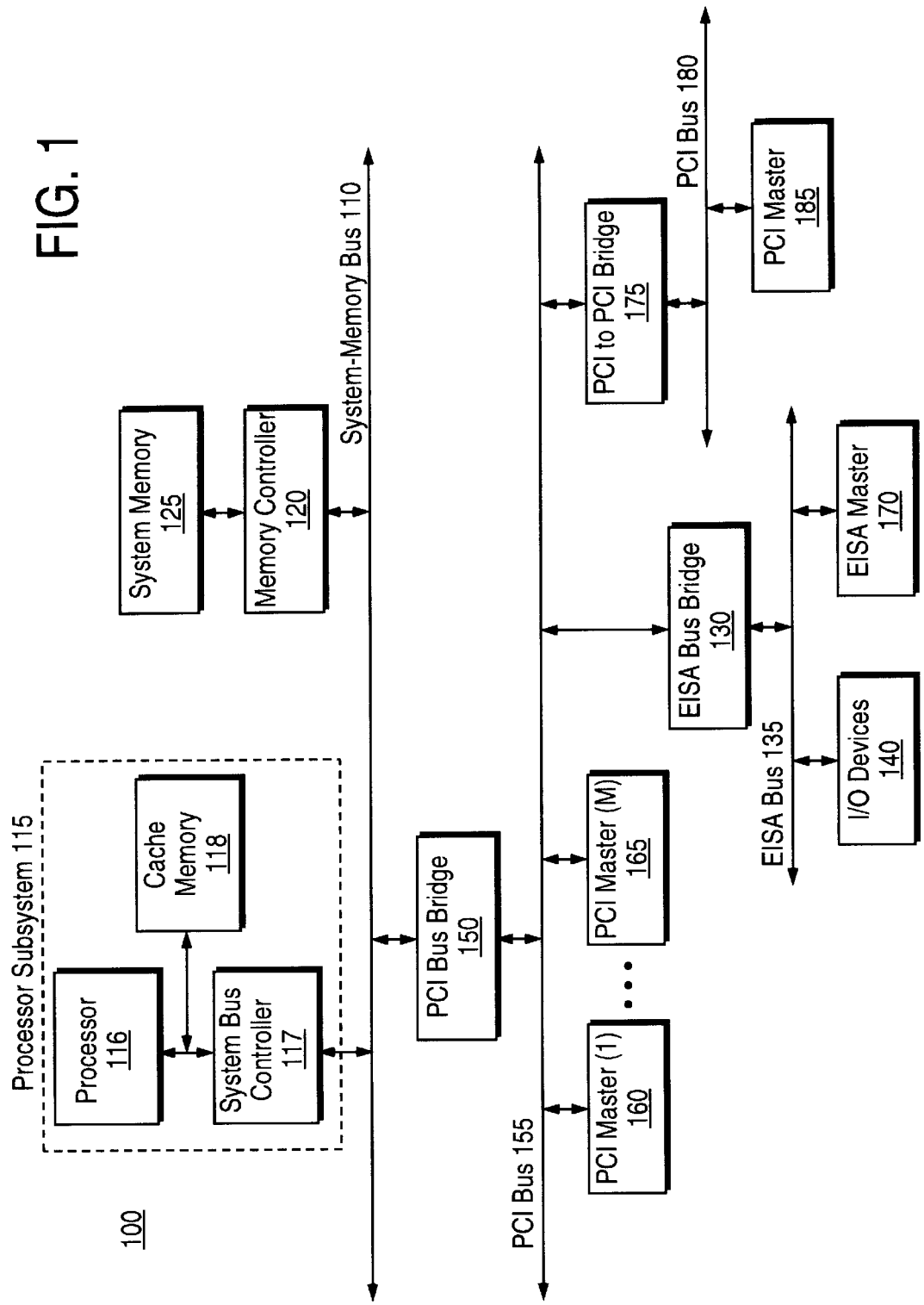

METHOD AND APPARATUS FOR REDUCING BUS BRIDGE THRASHING BY TEMPORARILY MASKING AGENT REQUESTS TO ALLOW CONFLICTING REQUESTS TO BE COMPLETED

BACKGROUND OF THE INVENTION

1. Field of the Invention

The present invention pertains to data transfers in a computer system. More particularly, this invention relates to transferring data between two buses in a computer system using a bus bridge.

2. Background

As technology has progressed, the number, types, and functional power of computer system components has steadily increased. Given the large number and different operating speeds of different components, modern computer systems typically include two, three, or more buses for coupling together the different components.

One device commonly used to couple together two buses is referred to as a bus bridge. Typically, requests transferred between buses via a bus bridge can be either posted or non-posted. A posted request refers to a request from a source agent on a source bus which has been accepted by the bridge, and the source agent knows that the request will be provided to the target agent on the target bus, regardless of whether the request has been actually delivered to the target agent yet or whether it is pending in a buffer in the bridge. A non-posted request refers to a request which is being transferred through the bus bridge and the source agent does not know whether the request can be delivered to the target agent until it is actually received by the target agent.

One important goal in designing a bus bridge is to provide an efficient communication path between the two buses. However, one problem that can arise when using a bus bridge is referred to as "thrashing". Thrashing refers to a situation where both of the buses are fully utilized, but very few, if any, data transfers between the two buses can progress. This situation can arise, for example, in a system having a bus bridge coupling a system bus and a Peripheral Component Interconnect (PCI) bus, such as a bus in accordance with the PCI Local Bus Specification, Version 2.0, published Apr. 30, 1993, or Version 2.1, published Jun. 1, 1995. If an agent on the PCI bus is writing to main memory on the system bus and posting in the bus bridge is disabled, then if a processor on the system bus is repetitively issuing requests targeting the PCI bus, each of the requests outstanding on the buses can prevent the requests of the other from progressing. When thrashing occurs, data transfers between the two buses cannot be made. Furthermore, the requests which are causing the thrashing to occur may also lock up the two buses such that no other requests can be issued by other agents on those buses. It would be beneficial to provide a mechanism which reduces thrashing in a computer system.

An additional problem which can arise when using a bus bridge is referred to as "livelock". A livelock condition refers to a thrashing condition that persists indefinitely. Given the indefinite duration, the livelock can lock up the computer system for an indefinite period of time. It would be beneficial to provide a mechanism which reduces livelock in a computer system.

Another problem which can arise when using a bus bridge is referred to as read starvation. Read starvation of a PCI bus master, for example, can occur if the PCI bus master is not able to get through to the system bus because of requests from system bus masters. Read starvation can result in poor system performance, due to the inability of the PCI bus master to perform its tasks. It would be beneficial to provide a mechanism which reduces read starvation in a computer system.

As will be described in more detail below, the present invention provides a method and apparatus for masking processor requests to achieve these and other desired results which will be apparent to those skilled in the art from the description that follows.

SUMMARY OF THE INVENTION

A method and apparatus for masking processor requests to improve bus efficiency is described herein. A bus bridge includes a detection logic to determine when a first processor on a first bus has been backed off the first bus a predetermined number of times. When the detection logic determines the first processor has been backed off the first bus the predetermined number of times, a timer is set to a first value sufficient to allow an agent on a second bus to access the first bus. A masking logic, coupled to the detection logic and the timer, masks requests from the first processor until the timer expires.

Additionally, in one embodiment of the present invention, a sensing logic monitors PCI master requests for the first bus. If the sensing logic senses that no PCI master requests for the first bus have occurred for a period of time, the processor is unmasked and the timer is cleared.

BRIEF DESCRIPTION OF THE DRAWINGS

The present invention is illustrated by way of example and not limitation in the figures of the accompanying drawings, in which like references indicate similar elements and in which:

FIG. 1 is a block diagram of a computer system such as may be used with the present invention;

DETAILED DESCRIPTION

Figure 2A:
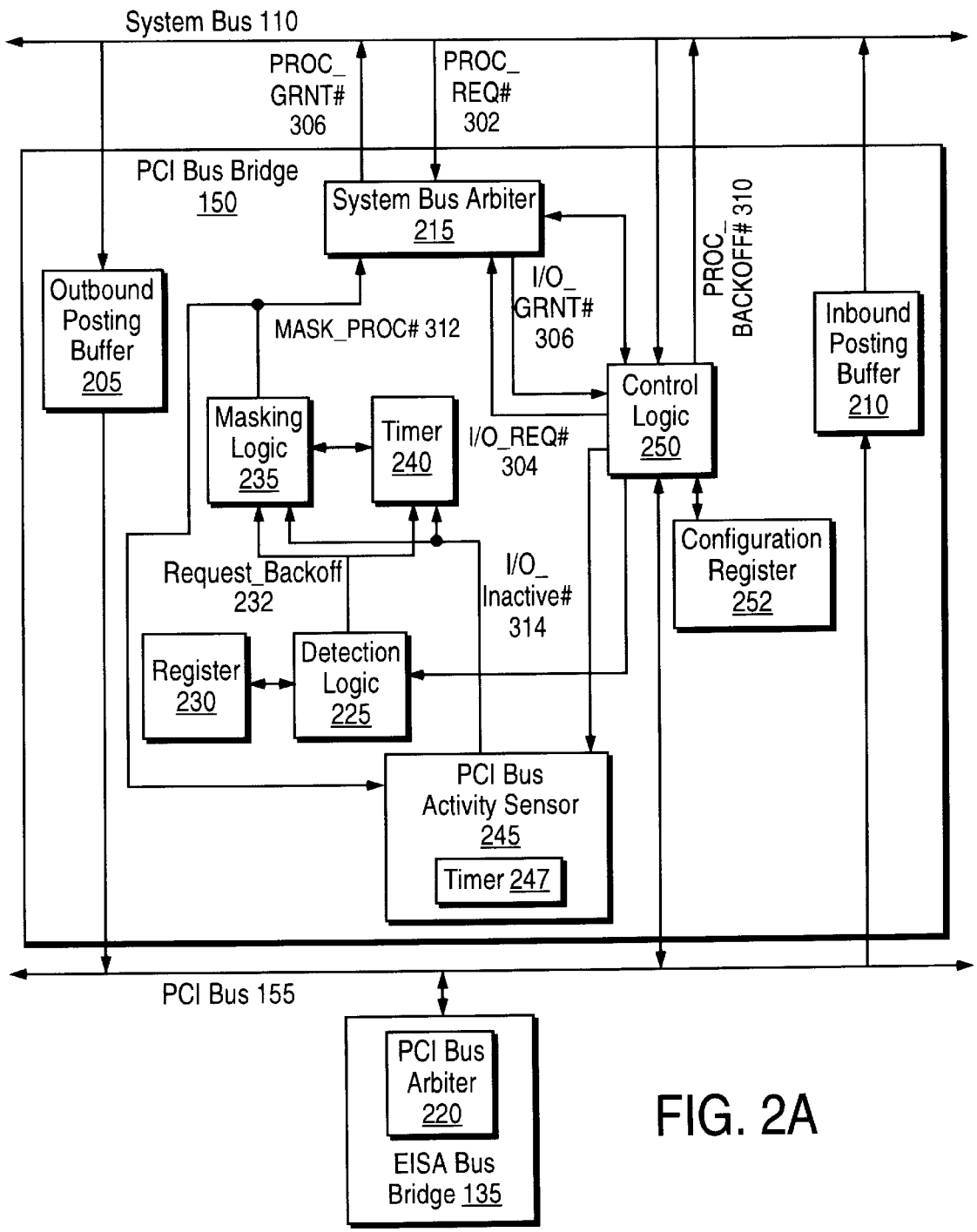
FIG. 2a is a block diagram illustrating a bus bridge according to one embodiment of the present invention.

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

In the descriptions which follow, reference is made to various signals being asserted or deasserted. In order to avoid confusion, these signals have been discussed as being asserted when in a low state and deasserted when in a high state (referred to as "active low" signals). A high state typically represents a voltage of between 1.8 and 5.5 volts, and a low state typically represents a voltage of between 0.0 and 0.5 volts. However, it is to be appreciated that the present invention can be implemented with signals which are asserted in a high state and deasserted in a low state (referred to as "active high" signals), or a combination of active high and active low signals.

The present invention provides a mechanism for masking processor requests to improve bus efficiency in a computer system. When a request is made from a source processor (or other source agent) on a source bus to a target agent on a target bus, the request is transferred between the two buses via a bus bridge. If the source processor is backed off the source bus more than a predetermined number of times, then the source processor is masked off for a predetermined period of time. Requests for control of the source bus by the source agent are ignored while the source agent is masked. This masking should provide sufficient time for request(s) conflicting with the bus ownership to be completed, thereby improving bus efficiency in the computer system.

FIG. 1 is a block diagram of a computer system such as may be used with the present invention. A computer system 100 is shown comprising a system-memory bus or other communication device 110 for communicating information to and from the processor sub-system 115. In one embodiment, the system bus 110 includes address, data and control buses. In one implementation, the present invention includes an Intel architecture microprocessor 116 as part of the processor sub-system 115, such as a Pentium® processor, available from Intel Corporation of Santa Clara, Calif.; however, the present invention may utilize any type of processor architecture. The processor sub-system 115 is for processing information and instructions. The processor sub-system 115 may also contain a system bus controller 117 for providing an interface between the processor 116 and the system bus 110, and a cache memory 118 for temporarily storing information and/or instructions for the processor 116. In an alternate embodiment, the processor 116 is coupled directly to the system bus 110 rather than being part of the processor sub-system 115. The system 100 also includes a memory controller 120 and a system memory 125 of random access memory (RAM) coupled with the system bus 110 for storing information and instructions for the processor 116.

A bridge 150 is also coupled to the system bus 110 for coupling the processor bus 110 to one or more additional, typically I/O, buses. In one embodiment, this bus is a Peripheral Component Interconnect (PCI) bus 155, as described in the PCI Local Bus Specification, Version 2.1, published Jun. 1, 1995. In another embodiment, the PCI bus 155 operates according to the PCI Local Bus Specification, Version 2.0, published Apr. 30, 1993. A PCI bus bridge 150 couples the system bus 110 to the PCI bus 155. Multiple PCI bus masters 160 and 165 (also referred to herein as bus agents) can be coupled to the PCI bus 155. These PCI bus masters 160 and 165 can be any of a wide variety of components, including a mass storage device such as a magnetic or optical disk and disk drive, and a video controller and display device. Additional devices which can be coupled to the PCI bus 155 include, for example, a read only memory (ROM), an alphanumeric input device including alphanumeric and function keys, a cursor control device, a hard copy device such as a plotter or printer, or a network adapter device such as a Local Area Network (LAN) adapter.

In one embodiment, the PCI bus 155 is also coupled to an Extended Industry Standard Architecture (EISA) bus 135 via an EISA bus bridge 130. Multiple I/O devices 140 and EISA bus master devices 170 (both of which are also referred to herein as bus agents) can be coupled to the EISA bus 135 which input and output data to and from the processor 116, via the EISA bus bridge 130, PCI bus 155, PCI bus bridge 150, and system bus 110. Additionally, EISA bus master devices 170 can also input and output data to and/or from other devices in the system 100. These devices may include any of the I/O devices which can be coupled to the PCI bus 155 as discussed above, such as a ROM, an alphanumeric input device, a network adapter, etc.

In one embodiment, a second PCI bus 180 is also coupled to the PCI bus 155 via a PCI to PCI bus bridge 175. Additional PCI bus masters 185 can be coupled to the PCI bus 180, analogous to PCI bus masters 160 and 165.

In one embodiment, a third PCI bus (not shown) is coupled to the system bus 110 via another PCI bus bridge (not shown), analogous to PCI bus 155 and PCI bus bridge 150.

It is to be appreciated that certain implementations of the system 100 may include additional processors or other components. For example, two or more processor sub-systems 115 having processors 116 of the same or different types may be coupled to the system bus 110. Furthermore, certain implementations of the present invention may not require nor include all of the above components. For example, PCI masters 160 and 165 may not include a display device. Alternatively, the system 100 may not include an EISA bus 135 and EISA bus bridge 130, or a PCI bus 180 and PCI to PCI bus bridge 175.

It is also to be appreciated that alternate embodiments of the system 100 can include additional buses and bus bridges. For example, multiple PCI buses with corresponding bus bridges may be coupled to the PCI bus 155 or the system bus 110. By way of another example, additional hierarchical levels of PCI buses may be included, such as an additional PCI bus coupled to PCI bus 155 or PCI bus 180 via an additional PCI bus bridge.

FIG. 2a is a block diagram illustrating a bus bridge according to one embodiment of the present invention. PCI bus bridge 150 includes an outbound posting buffer 205 and an inbound posting buffer 210 for buffering posted transactions. In the illustrated embodiment, "outbound" transactions refer to transactions from the system bus 110 targeting an agent on the PCI bus 155, and "inbound" transactions refer to transactions from the PCI bus 155 targeting an agent on the system bus 110. In one embodiment of the present invention, only write requests can be posted.

In one embodiment of the present invention, read requests are not permitted to be posted. Thus, a read request which issues on the system bus 110 and targets an agent on another bus passes through the bridge 150 and is issued on the PCI bus 155. In one embodiment, the system bus 110 is a single transaction bus, supporting only one transaction pending on the system bus 110 at a time.

In the discussions to follow, reference is made to a processor on the system bus 110 issuing a request. However, it is to be appreciated that other agents coupled to the system bus 110 could also issue a request.

Arbitration for the system bus 110 is controlled by a system bus arbiter 215 in the PCI bus bridge 150, whereas arbitration for the PCI bus 155 is controlled by a PCI bus arbiter 220, which in one embodiment is in the EISA bus bridge 135. A processor or other system bus master which desires to issue a request on the system bus 110 (also referred to herein as a source agent) asserts a PROC_REQ# signal 302 to the system bus arbiter 215. Eventually, the system bus arbiter 215 grants control of the system bus 110 to the requesting processor. If the request is a non-postable request targeting an agent on the PCI bus 155 (for example, a read request to either a PCI master on the PCI bus 155 or an I/O device on the EISA bus 135 of FIG. 1), then the request is not posted, and the bus bridge 150, via control logic 250, attempts to gain control of the PCI bus 155 by asserting a bus request signal to the PCI bus arbiter 220.

If the PCI bus 155 is available, then control of the PCI bus 155 is granted to the PCI bus bridge 150. In this situation, the request is issued on the PCI bus 155. It is to be appreciated, however, that the request may not yet be satisfied. For example, if the request targets an agent on the PCI bus 180 or on the EISA bus 135, then the request may be re-tried or otherwise denied access to the PCI bus 180 or the EISA bus 135. In this situation, a "backoff" signal (PROC_BACKOFF# 310 as illustrated) is returned to the requesting processor on the system bus 110. The PROC_BACKOFF# signal 310 indicates to the requesting processor that the request could not be completed at the present time and that the bus cycle begun by the requesting processor is to be terminated and retried at a later time, if desired by the requesting processor, so that the system bus 110 is available to the PCI bus bridge 150.

If the PCI bus 155 is not available when the PCI bus bridge 150 requests control of the PCI bus 155, then the bridge 150 is retried on the PCI bus 155. In this situation, control logic 250 asserts a backoff signal to the requesting processor on the system bus 110 in response to being retried on the PCI bus 155.

Additionally, in one embodiment of the present invention, it is not possible for a processor on system bus 110 to read from agents on the PCI bus 155 if the inbound buffers 210 are not empty. This inability to read can be referred to as a buffer resource conflict. Thus, in this embodiment, if the inbound write posting buffers 210 in the PCI bridge 150 are not empty and the requesting processor issues a non-postable request to the PCI bridge 150, then the control logic 250 asserts a backoff signal to the requesting processor on the system bus 110.

A similar interlock situation can also arise in the EISA bus bridge 130, the PCI to PCI bridge 175, or an "interlocked" version of PCI master 160. For each of these bus agents, inbound posted write data internal to the agent may prevent an outbound read from the system bus 110 from completing, either on a bus further removed from the system bus 110, or within the particular agent itself. The agent which prevents the outbound read from completing retries the requesting agent, which is PCI bus bridge 150, which then backs off the requesting processor on the system bus 110.

Typically, if a processor is backed off the system bus 110, it immediately repeats its request by again asserting a PROC_REQ# signal to the system bus arbiter 215. In one embodiment, the system bus arbiter 215 employs an arbitration policy in which a processor which is backed off from the system bus 110 is given the highest priority for the next arbitration cycle. This policy ensures that the processor can immediately gain control of the system bus 110 again after being backed off, subject to the masking of the processor discussed below.

In one embodiment of the present invention, if a processor initiated cycle is retried on the PCI bus 155 by an agent coupled to the PCI bus 155, a PCI bus interface (not shown) in the bridge 150 samples STOP# asserted and TRDY# negated on the PCI bus 155. The PCI bus interface then asserts a signal to the control logic 250 indicating the request was retried, in response to which the control logic 250 asserts a PROC_BACKOFF# signal 310 to the requesting processor.

According to one embodiment of the present invention, the PCI bus bridge 150 also includes a detection logic 225, a register 230, a masking logic 235, and a timer 240. The detection logic 225 monitors whether the processor that issued the current request has been backed off the system bus 110. In one embodiment, the control logic 250 indicates to the detection logic 225 whether the processor is backed off or successfully accesses the target agent. If the control logic 250 indicates the processor is backed off, then the detection logic 225 sets a bit in the register 230. However, if the control logic 250 indicates the processor is not backed off, then the detection logic 225 clears the bit in the register 230. In one embodiment, the register 230 is a single bit register which maintains a record of whether the processor which issued the current transaction has been backed off the system bus. Thus, in this embodiment, the register 230 maintains a record of whether a processor has been backed off the system bus 110 twice consecutively.

After a request has been retried and the processor has been backed off the system bus, the requesting processor again issues the request on the system bus 110 and may again be backed off. If the control logic 250 again indicates the processor is backed off, the detection logic 225, based on the bit being set in the register 230, knows that this is the second time the processor has been backed off.

Upon detecting a second consecutive backoff for the processor, the detection logic 225 asserts a request_backoff# signal 232 to the masking logic 235 and the timer 240. The request_backoff# signal 232 causes the masking logic 235 to mask off requests from the processor that was retried. The masking logic 235 asserts a MASK_PROC# signal 312 to the system bus arbiter 215 which indicates to the arbiter 215 that requests for the system bus 110 from the processor that was retried should be ignored.

The processor is masked off for a predetermined period of time, as indicated by the timer 240. The request_backoff# signal 312 to the timer 240 starts the timer 240. In one embodiment, the timer 240 is a 16 microsecond timer. However, it is to be appreciated that different values can be used. Typical values for the timer 240 range from 4 microseconds to several milliseconds. It should be noted that the timer 240 should have a value which provides sufficient time for a PCI master on the PCI bus 155 to perform a read or write request on the system bus 110, taking into account the time necessary for propagation of the request through the bridge 150 and the handshaking between the bridge 150 and the target agent (such as system memory 125) on the system bus 110, as well as other data transfer protocols which are to be satisfied.

The timer 240 begins counting upon receiving the request_backoff# signal 232 from the detection logic 225. In an alternate embodiment, the timer 240 begins counting as soon as the processor releases the system bus 110 (in response to the PROC_BACKOFF# signal 310). When the timer 240 expires, the timer 240 asserts a signal to the masking logic 235. In response to this signal from the timer 240, the masking logic 235 unmasks the processor. The masking logic 235 deasserts the MASK_PROC# signal 312 to the system bus arbiter 215 when the timer 240 expires.

Thus, the next request for the system bus 110 by the processor will be granted by the system bus arbiter 215. The period of time in which the processor was masked off should provide sufficient time for whatever transaction was causing the retry on the PCI bus 155 to complete. It should be noted, however, that the processor can be masked off again if necessary (for example, the time was not sufficient for a PCI master on the PCI bus 155 to complete its access to the device on the system bus 110).

In one embodiment of the present invention which supports multiple processors on the system bus 110, if a particular processor is backed off, then requests for control of the system bus 110 by all other processors are ignored until the backed off processor is unmasked and has obtained control of the system bus 110.

In one embodiment of the present invention, the PCI bus bridge 150 also includes an optional PCI bus activity sensor 245. The PCI bus activity sensor 245 monitors the I/O_REQ# signal 304. Whenever a master on the PCI bus 155 issues a request targeting an agent on the system bus 110, the control logic 250 asserts the I/O_REQ# signal 304 to the system bus arbiter 215, which in turn asserts I/O_GRNT# signal 306 when control of the system bus 110 is granted to the bridge 150. Whenever the I/O_REQ# signal 304 is asserted, the activity sensor 245 resets a timer 247. In one embodiment, the timer 247 is started when the MASK_PROC# signal 312 is asserted. In one implementation, the timer 247 is enabled only while the MASK_PROC# signal 312 is asserted.

In one embodiment, the timer 247 is a two microsecond timer. However, it is to be appreciated that different values can be used. Typical values for timer 247 range from one microsecond up to the value of the timer 240 discussed above.

Thus, upon expiration of the timer 247, no requests from the PCI bus 155 have targeted the system bus 110 for the duration of the timer 247. Upon expiration of the timer 247, the activity sensor 245 asserts an I/O_INACTIVE# signal 314 to the masking logic 235 and the timer 240. In response to the I/O_INACTIVE# signal 314 from the activity sensor 245, the masking logic 235 unmasks the processor, provided the processor is currently being masked, and the timer 240 is cleared. Thus, in this embodiment, the processor bus requests are no longer ignored by the system bus arbiter 215, even though the timer 240 may not have expired yet. In an alternate embodiment, the activity sensor 245 does not assert the I/O_INACTIVE# signal 314 to the masking logic 235; rather, the clearing of the timer 240 causes the timer 240 to assert the signal to the masking logic 235 indicating that the timer 240 has expired.

In another embodiment of the present invention, the bridge 150 does not include the register 230; as soon as a processor is backed off, the request_backoff signal 232 is asserted to the masking logic 235. In an alternate implementation, the detection logic 225 is also not in this embodiment. Without the detection logic, the PROC_BACKOFF# signal 310 is input to the timer 240 and the masking logic 235. In this implementation, the assertion of the PROC_BACKOFF# signal 310 causes the masking logic 235 to assert the MASK_PROC# signal 312.

It is to be appreciated that in alternate embodiments different backoff counts can be used, such as three, four, five, etc. In these alternate embodiments, the register 230 is increased in size, dependent on the maximum count to be supported.

Also in the embodiments discussed above, the arbitration policy employed by the system bus arbiter 215 gives a processor which is backed off from the bus the highest priority in the next arbitration cycle. In alternate embodiments, different arbitration policies can be supported. In these alternate embodiments, additional tracking of processor requests can be employed in the bus bridge 150 to properly track the number of consecutive backoff signals given to a particular processor. For example, a different register 230 could be used for each possible processor in the system, or a processor identifier could be recorded. Alternatively, the bridge 150 may track, via detection logic 225 and register 230, the number of consecutive backoffs without distinguishing between which processors issued the requests.

In one embodiment of the present invention, the timer 240 is programmable. This programmability is achieved, in one implementation, by having two bits of a configuration register 252 in the bridge identify the value for timer 240. The values of these two bits can then be changed in any of a wide variety of conventional manners, such as setting jumpers or having a software routine write to the configuration register 252. Whenever the timer 240 is started, the period of time it is set for is determined based on these two bits in the configuration register 252. The values of these bits and the corresponding timer period are shown below in Table I.

TABLE I

| Bit Settings | Timer Value |
| --- | --- |
| 00 | 1 microsecond |
| 01 | 4 microseconds |
| 10 | 16 microseconds |
| 11 | 64 microseconds |

In an alternate embodiment, this programming can be achieved by storing the value of the timer in a register which can be written by software. In this implementation, when the timer 240 is activated by the detection logic 225, the timer 240 accesses the programmable register to determine the period for the timer 240. It is to be appreciated that the timer 240 can be either a count up or a count down timer.

In another alternate embodiment of the present invention, the value of the timer 240 can be adaptive in the bridge. For example, the value of the timer can be increased if a processor(s) is masked more frequently than a first predetermined frequency and/or can be decreased if a processor(s) is masked less frequently than a second predetermined frequency.

In one embodiment of the present invention, the timer 247 is also programmable and/or adaptable. This programmability and/or adaptability can be achieved in the same manner as discussed above with respect to timer 240.

Also in the embodiments discussed above, a single PCI bus bridge 150 is described. It is to be appreciated, however, that alternate embodiments can include computer systems having multiple PCI bus bridges analogous to bridge 150. It is to be appreciated that in these alternate embodiments, if multiple PCI bus bridges 150 are connected to the same system bus 110, then only one of the bridges is responsible for arbitration. The other bus bridges request access for the system bus from the system bus arbiter in the one bridge responsible for arbitration.

Figure 2B:
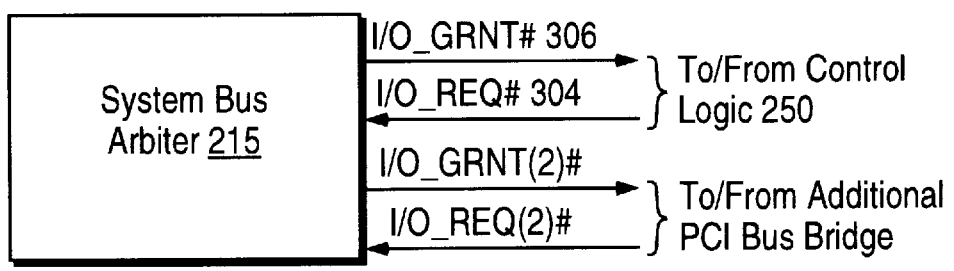
FIG. 2b is a block diagram illustrating a system bus arbiter such as may be used with one embodiment of the present invention.

In embodiments with multiple PCI bus bridges 150 connected to the same system bus 110, the system bus arbiter in the one bridge responsible for arbitration contains additional I/O_REQ# and I/O_GRNT# signals for each additional bridge, as illustrated in FIG. 2b. In order to obtain control of the system bus 110, a bridge asserts its I/O_REQ# signal to the one bridge responsible for arbitration. The system bus arbiter in turn asserts an I/O_GRNT# to the bridge, indicating the requesting bridge has control of the system bus 110.

The system bus arbiter 215 in the bridge responsible for arbitration informs the control logic 250 in the bridge responsible for arbitration of any I/O_REQ# signals from any of these multiple PCI bus bridges. The control logic 250 in turn informs the PCI bus activity sensor 245 whenever any I/O_REQ# is active, thereby allowing the timer 247 to be reset whenever any I/O_REQ# from any bridge is active.

Additionally, in one embodiment if a bridge other than the bridge responsible for arbitration needs to backoff a processor, that bridge asserts a signal to the bridge responsible for arbitration, which in turn asserts the PROC_BACKOFF# signal 310.

It is also to be appreciated that although the system bus arbiter 215 is shown as being part of the PCI bus bridge 150 and the PCI bus arbiter 220 is shown as being part of the EISA bus bridge 135, in alternate embodiments the arbiters 215 and 220 can be located in different components. For example, the PCI bus arbiter 220 can alternatively be located in another PCI master on the PCI bus 155 or the PCI bus bridge 150, or can be a separate arbiter device coupled to the PCI bus 155. Similarly, the system bus arbiter 215 can be part of another device, such as the memory controller or a processor, on the system bus 110, or can be a separate arbiter device coupled to the system bus 110.

Figure 3A:
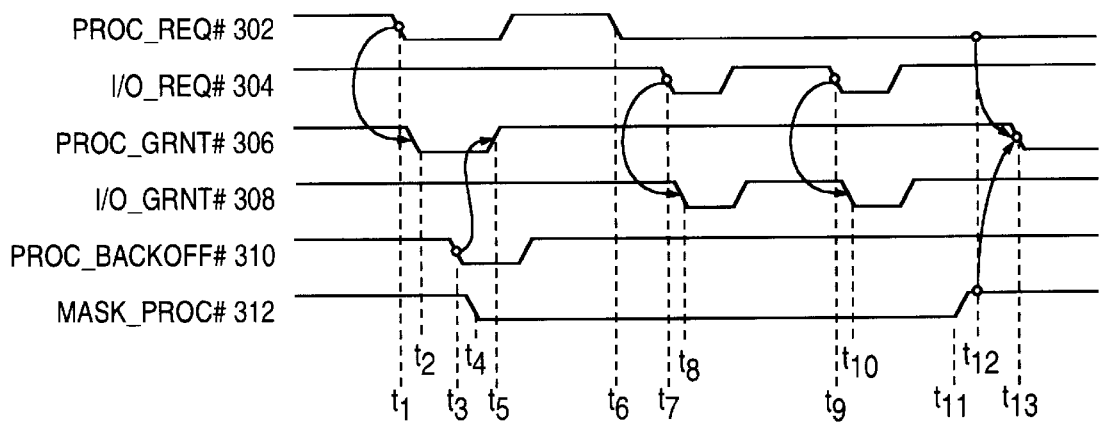
FIGS. 3a and 3b are timing diagrams illustrating the timing of signals according to one embodiment of the present invention.
Figure 3B:
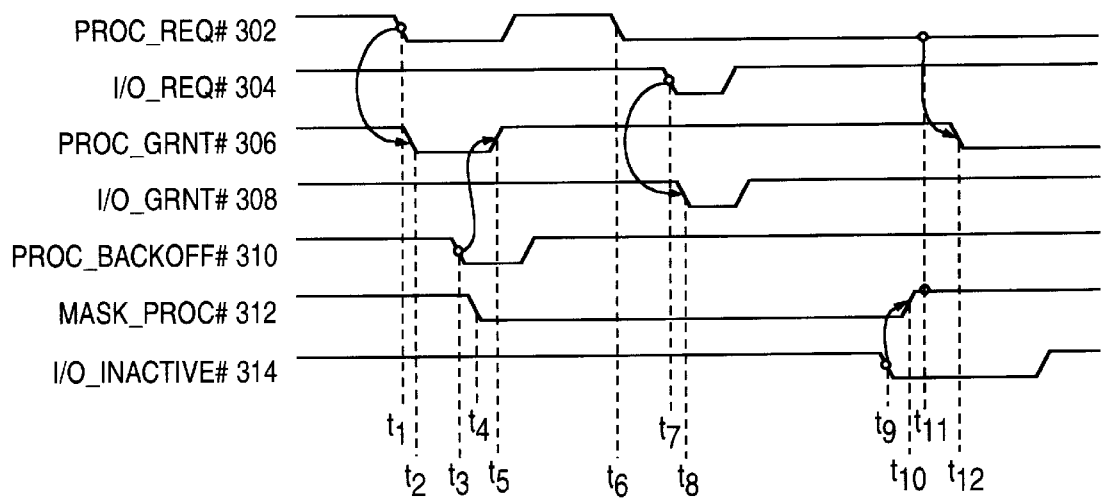

FIGS. 3a and 3b are timing diagrams illustrating the timing of signals according to one embodiment of the present invention. FIG. 3a is a timing diagram illustrating the masking off of a processor according to one embodiment of the present invention. The PROC_REQ# signal 302 is first asserted by the processor, time $t_1$, and the system bus arbiter gives control of the bus to the processor by asserting the PROC_GRNT# signal 306, time $t_2$. If the request cannot be issued on or satisfied by an agent on the PCI bus, then the bridge provides a PROC_BACKOFF# signal 310 to the requesting processor, time $t_3$. In response to the PROC_BACKOFF# signal 310, the system bus arbiter deasserts the PROC_GRNT# signal 306, time $t_5$. Additionally, assuming that the processor has been backed off a predetermined number of times (for example, once), the masking logic asserts a MASK_PROC# signal 312 to the system bus arbiter, time $t_4$.

The requesting processor then re-asserts the PROC_REQ# signal 302, time $t_6$. However, since the MASK_PROC# signal 312 is being asserted at time $t_6$, the PROC_REQ# signal 302 is ignored by the system bus arbiter. During assertion of the MASK_PROC# signal 312, additional attempts by a PCI master(s) to access the system bus can occur as shown by the I/O_REQ# signal 304 and the I/O_GRNT# signal 308, times $t_7$, $t_8$, $t_9$, and $t_{10}$.

After the programmed time, the timer expires and the MASK_PROC# signal 312 is deasserted, time $t_{11}$, thereby unmasking the processor. Thus, at time $t_{12}$, the PROC_REQ# signal 302 is asserted and the MASK_PROC# signal 312 is deasserted, so the system bus arbiter grants control of the system bus to the requesting processor by asserting the PROC_GRNT# signal 306 at time $t_{13}$.

FIG. 3b is a timing diagram illustrating the masking off of a processor, according to one embodiment of the present invention, where the processor is unmasked due to a lack of requests targeting the system bus from PCI bus masters. The PROC_REQ# signal 302, PROC_GRNT# signal 306 and PROC_BACKOFF# signal 310 are asserted and deasserted in times $t_1$–$t_6$ as discussed above in FIG. 3a. Additionally, some PCI bus activity also occurs, times $t_7$ and $t_8$, while the MASK_PROC# signal 312 is asserted. However, the PCI bus activity sensor senses the lack of requests for the system bus for a predetermined period of time (for example, 2 microseconds), and asserts the I/O_INACTIVE# signal 314, time $t_9$. The masking logic deasserts the MASK_PROC# signal 312 in response to the I/O_INACTIVE# signal 314, time $t_{10}$, thereby unmasking the processor. Thus, at time $t_{11}$, the PROC_REQ# signal 302 is asserted and the MASK_PROC# signal 312 is deasserted, so the system bus arbiter grants control of the system bus to the requesting processor by asserting the PROC_GRNT# signal 306 at time $t_{12}$.

Figure 4:
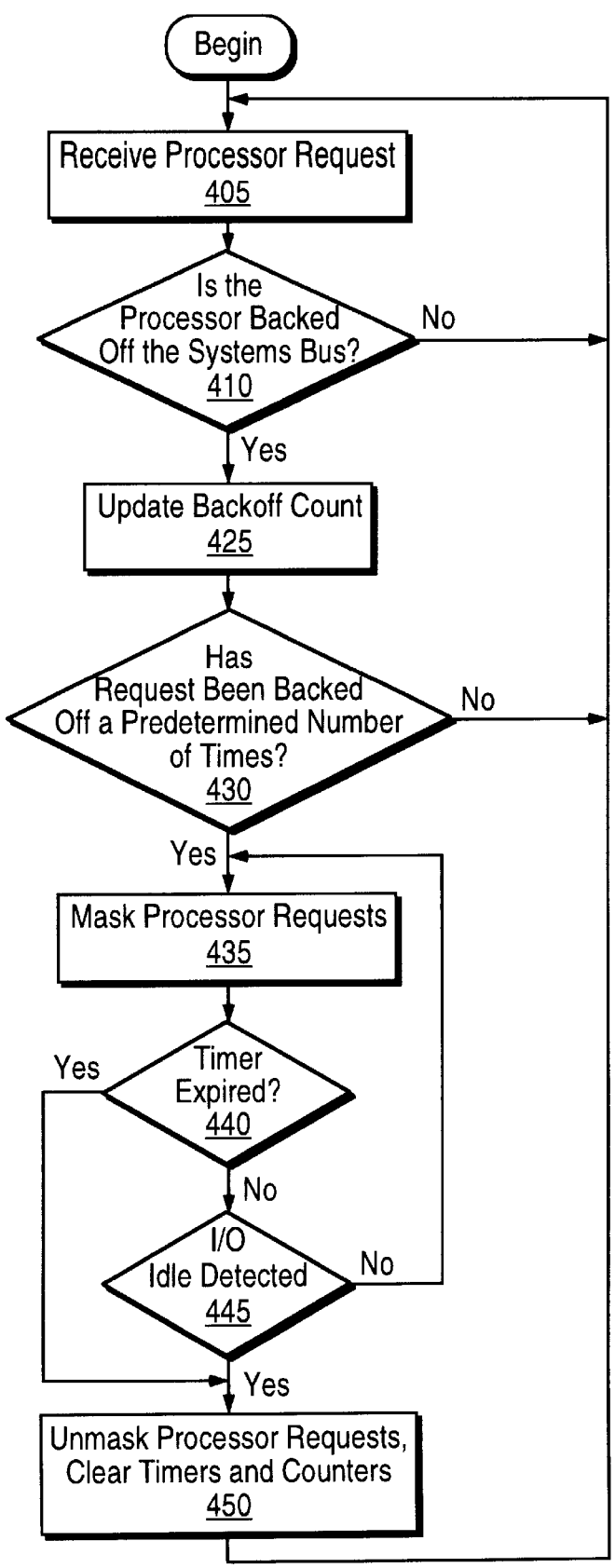
FIG. 4 is a flowchart illustrating the steps followed in processing a non-postable request received by a bus bridge according to one embodiment of the present invention.

FIG. 4 is a flowchart illustrating the steps followed in processing a non-postable request received by a bus bridge according to one embodiment of the present invention. The bridge first receives the non-postable request, step 405. The processor which issued the request is either backed off or not, step 410. If the processor is not backed off, the request will issue on the PCI bus, and another processor request can be received, step 405.

However, if the processor is backed off, then the detection logic increments the backoff count for the processor, step 425. The detection logic then determines whether the processor has been backed off a predetermined number of times, step 430. If the request has not been backed off the predetermined number of times, then the process returns to step 405, where the bridge again receives the request (due to the processor re-issuing the request).

If the request has been retried the predetermined number of times in step 430, then the masking logic masks processor requests, step 435. The masking continues until either the timer expires or there are no requests for the system bus for a predetermined period of time (I/O requests are detected idle), steps 440 and 445, at which time the masking logic unmasks the processor requests, step 450. Additionally, the timers that were set, as well as any other counters, status bits, etc. that were set for masking the processor or determining when or how long to mask the processor are cleared in step 450.

In one embodiment, the steps shown in FIG. 4 are repeated until the request is issued on the PCI bus.

Thus, the present invention provides a bus bridge which improves bus efficiency in a computer system. A requesting agent on a source bus is masked off for a period of time after it has been backed off the source bus a predetermined number of times. This masking should provide sufficient time for the conflicting request to be completed, thus allowing the requesting agent to proceed with its request without thrashing when the masking has completed, and also without starving off a PCI bus master, thereby improving bus efficiency in the system.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

Thus, a method and apparatus for masking processor requests to improve bus efficiency has been described.

What is claimed is:

1. A bus bridge comprising:
   a detection logic to determine when a first processor coupled to a first bus has been backed off the first bus a predetermined number of times;
   a timer, responsive to the detection logic determining the first processor has been backed off the first bus the predetermined number of times, to count for a period of time;

a masking logic, coupled to the timer, to mask requests from the first processor until the timer expires; and a sensing logic to sense a lack of requests by agents on a second bus for access to the first bus for a predetermined period of time, and wherein the masking logic masks requests from the first processor until either the timer expires or the sensing logic senses the lack of requests for the predetermined period of time.

2. A computer system comprising:

a first bus;

a second bus;

one or more processors coupled to the first bus;

one or more bus masters coupled to the second bus; and a bus bridge coupled to the first bus and the second bus, wherein the bus bridge includes,
   a detection logic to determine when a first processor of the one or more processors has been backed off the first bus a predetermined number of times,
   a timer, responsive to the detection logic determining the first processor has been backed off the first bus the predetermined number of times, to count for a period of time,
   a masking logic, coupled to the timer, to mask requests from the first processor until the timer expires, and
   a sensing logic to sense a lack of requests by agents on the second bus for access to said first bus for a predetermined period of time, and wherein the masking logic masks requests from the first processor until either the timer expires or the sensing logic senses the lack of requests for the predetermined period of time.

3. An apparatus comprising:

means for determining when a processor coupled to a first bus has been backed off the first bus a predetermined number of times;

means, responsive to the means for determining the processor has been backed off the first bus the predetermined number of times, for counting for a period of time;

means, coupled to the means for counting, for masking requests from the processor until the period of time has elapsed; and means for sensing a lack of requests by agents on a second bus for access to the first bus for a predetermined period of time, and wherein the means for masking masks requests from the processor until either the period of time has elapsed or the means for sensing senses the lack of requests for the predetermined period of time.

4. A method for masking processor requests, the method comprising:

checking whether a first processor coupled to a first bus has been backed off the first bus a predetermined number of times;

masking requests from the first processor until a timer expires if the first processor has been backed off the first bus the predetermined number of times;

sensing a lack of requests on a second bus for access to the first bus for a predetermined period of time; and unmasking requests from the first processor if the lack of requests on the second bus for access to the first bus is sensed.

* * * * *